Patented June 22, 1937

2,084,534

UNITED STATES PATENT OFFICE 2,084,534

ABRASIVE ARTICLE

Harry C. Martin, Niagara Falls, N. Y., and Frederick A. Upper, Niagara Falls, Ontario, Canada, assignors, by mesne assignments, to The Carborundum Company, Niagara Falls, N. Y., a corporation of Delaware No Drawing. Application September 28, 1933, Serial No. 691,414

4 Claims. (Cl. 51—278)

This invention relates to an improved process of producing abrasive articles. More specifically the invention is concerned with bonded abrasive articles such as abrasive wheels and stones in which the bond is of a resinous nature.

Resin bonded abrasive articles have been made heretofore by one of two general types of process; namely, the hot press process or the cold press process. As the names imply, the hot press process utilizes a press in which the platens are heated whereas in the cold press process the articles are formed or shaped in a press with unheated platens.

During some stage in the process of making a resin bonded abrasive article it is necessary that the resin bond, which is non-adhesive at ordinary temperature, should be made soft, plastic, or sticky in order that it will adhere to the grain and that the particles of bond will cohere to form a continuous body. It is also necessary, from a practical standpoint, that the article should at some stage be compacted by pressure in order that the finished article will have the desired structure and sufficient strength to withstand the stresses to which it is subjected in use. This is usually done by pressing in a suitable press.

As previously stated the hot press process, as the name implies, is carried out in a press in which the platens are heated. The resin in the mixture is thereby rendered plastic by means of heat and the pressure is applied while the bond is in the heat-plastic condition.

According to the cold press process, as heretofore used, a mixture is made of the abrasive grains, the resin, and a liquid known as a plasticizer, an essential property being that the liquid, or plasticizer, is capable of rendering the mixture plastic. This requirement is met, for example, by a liquid which is a solvent for the resin. The mixture, which has been rendered plastic by the combination of the resin and the plasticizer, is then subjected to pressure in a press with unheated platens. The formed article, which has sufficient strength so that it can be removed from the mold, is then heated in an oven to indurate or harden the bond.

Articles made by the hot press process are relatively very dense because they are compacted while the resin is melted down to approximately the volume that it assumes in the final or hardened condition. The high density obtained by this process is a detriment for most purposes, because dense wheels cut slowly and tend to heat the work. Furthermore the process is applicable only to relatively thin articles because of the difficulty in heating the whole mass by applying heat to two sides; and because if articles much over a half inch in thickness are made by this process, the resin in contact with the platens becomes hardened to the infusible condition before that in the interior of the mass has been heated sufficiently to cause it to soften. Since the demand for articles of the characteristics obtainable by this process is relatively small, and the thickness of articles that can be made is limited, this process is used but very little in the abrasive industry.

Articles made by the cold press process, on the other hand, have proved to be very satisfactory for a great many purposes and have consequently come into widespread use. In contrast to hot pressed articles, they are relatively porous, and consequently are free and cool cutting and do not tend to heat the work. They are also usually of higher strength than the older ceramic bonded abrasives and therefore permit higher operating speeds than can safely be used with articles made with a ceramic bond.

Since resins possess physical characteristics quite different from those obtainable with the older types of bonds such as ceramic bodies, rubber or alkali silicates, abrasive articles bonded with resins and particularly phenolic condensation product resins, have made it possible to effect economies in certain grinding operations and to perform other types of operations which were impractical before their advent. This statement is true particularly as applied to articles made by the cold press process.

Although articles made by the cold press process have very desirable grinding characteristics and have therefore come into extensive use, the cold press method and its modifications, as heretofore employed in the production of abrasive articles have a number of disadvantages. For example, when the plasticizer is added to the mixture of grain and resin the mix becomes very sticky and tacky, and therefore not readily distributable in a mold. On the other hand, when the grains are wet with the plasticizer before the resin is mixed in, such mixture should be pressed to the desired shape comparatively soon after it has been prepared, else it tends to "dry out" to an extent that its plasticity is decreased or even lost entirely. Furthermore unless proper precautions are taken, the resin bond has a tendency to form into balls or pellets rather than to be distributed around the abrasive granules as a uniform coating; and the finished articles will not be entirely homogeneous and of uniform characteristics throughout, a fact which detracts from their value for obvious reasons.

Other disadvantages of the older processes reside in the fact that the resins and plasticizers used are sensitive to changes in humidity and temperature. Mixtures tend to become sticky and tacky even when they are left in an atmosphere of the average temperature and humidity encountered in the temperate zones in summer months, and it has been found to be necessary to install rather elaborate temperature and humidity controlling devices to obviate these troubles.

Again, the relatively low fusing point which accompanies the degree of solubility required in resins used in this process, in combination with the fact that resin solvents are used in the mixtures, makes it necessary to exercise considerable care in the final curing of the articles to avoid a concentration of the bond in the bottom of the article by reason of an actual flowing of the resin solution in the article. This tendency of the bond to flow makes it necessary to employ a relatively long heat treatment at relatively low temperatures, with consequent increase in the investment in ovens and in the time of processing.

We have discovered a method by which the difficulties heretofore experienced with the cold press process can be obviated and yet the porosity and other desirable characteristics of articles made by that method can be retained.

According to our new process we form an article in a mold of a mass of grains coated with resin and while it still is in the mold we apply sufficient heat to the article to render it self-supporting without carrying the heating far enough to complete the fusing of the resin whereby a compact and dense article would result.

The coated grains of which the article is molded can be obtained in any of a number of ways, one convenient method being to put abrasive grain which has been heated to about 275° F. into a mixer and add the powdered resin, agitating the mixture of resin and grain to assure a distribution of the resin through the mixture. If the mixture is allowed to cool in the mixer under suitable agitation, the mass will be well broken up into individual particles and small aggregates. If it is not so agitated while cooling the resin will solidify and unite the mixture into a solid, but readily broken up mass; so that in either case a product is obtained which consists of abrasive grains individually coated with resin.

Again, the grain can be coated with the resin by mixing the two ingredients at room temperature, subsequently heating and stirring the mass to assure a uniform distribution of the resin around the granules. We have also prepared the coated grains by bringing the heated abrasive grains into contact with the resin in finely divided and separated form: as for example, suspended in air in the form of a dust.

As a still further manner of obtaining coated grains, a solvent or plasticizer can be used in effecting the coating of the grains. The solvent or plasticizer can be added to the resin and the grains mixed with the softened resin; or as a preferred procedure, the solvent or plasticizer can be used to wet the grains, after which the grains may have resin in powdered form applied thereto so as to form a coating thereon. The grains thus coated are then subjected to a temperature of about 350° F. for approximately 2 to 3 minutes to cause the resin coating to fuse and uniformly coat each grain. This method of preparing coated granules is disclosed in copending application Serial No. 649,604, filed December 30, 1932.

The coated granules, as prepared by any of the alternative methods or by obvious equivalents of them consist, as indicated, of individual abrasive grains coated with fusible resin; by which is meant that the resin has been caused to adhere to the grain by a softening of the resin and yet it has not, in the case of heat-hardenable resins such as phenol condensation products in the fusible and soluble condition, been cured or advanced sufficiently to convert it to the infusible condition.

The shaping step of our process may take place in a hot press, or may take place in a cold press in which case either the coated grains are heated to a temperature of about 100° F. before they are placed in the mold or the mold and its contents are heated before the article is removed therefrom. This step includes putting the mixture into a suitable mold such as is in common use in the abrasive industry, and pressing to compact and shape the article. If it is performed in a hot press, the mold is left in the press for a comparatively short time (e. g. two minutes at a platen temperature of 300° F.), so that the resin on the surface of the article is softened sufficiently to form a continuous mass which hardens to a "skin" when the article is cooled, and thus permits removal of the formed article from the mold.

We have usually found it more convenient, however, to compact the mixture in a cold press. In the latter case, after the coated grain has been suitably compacted by applying pressures of about 2000 pounds per square inch, the mold is removed from the press and placed in an oven, the temperature of which may be about 300° F., for a time sufficient to soften the resin and cause the coated particles to cohere. The length of time necessary to accomplish this will depend upon the shape and dimensions of the article, as well as upon the temperature of the oven; but for a wheel 8 inches diameter by 1 inch thick is about 15 minutes at the temperature stated above, namely 300° F. When the resin has become softened sufficiently to cause cohesion of at least enough of the bond so that the article will be self-supporting when cold, the mold is removed from the oven and cooled.

In contrast to the usual cold press process, we start with grains which, though coated, are not sticky and are not caused to adhere to form a self-supporting article merely by being subjected to the usual molding pressures. We render the article self-supporting by heat applied either to the article while it is still in the mold or to the mix before it is put in the mold. After cooling, the article is removed from the mold, and while on a suitable support put into an oven for a final curing of the bond.

As a specific example of our invention, we have made abrasive articles by mixing 940 parts of fused alumina abrasive grain of number 16 mesh with 60 parts of the fusible and heat-hardenable phenolic condensation product which is known to the trade as "Bakelite BR—2417".

The mixture was prepared by heating the bare grain in an oven to a temperature of 275° F., transferring the heated grain to a mechanical type of mixer of the finger type and adding the resin and agitating the mixture for about 2 minutes. At the end of this time the mixture was dumped into a pan and allowed to cool to approximately room temperature whereupon it was found to have hardened to a continuous, but readily broken-up mass. The mass was then disintegrated into individual granules by passing it through a crusher the rolls of which were separated sufficiently to prevent crushing of the abrasive granules themselves.

The coated granules were then put into a mold, cold-pressed at 2000 pounds per square inch, and the mold containing the pressed article was then placed into an oven at 300° F., for 15 minutes. It was then removed from the oven and cooled to about 100° F. and the article was removed from the mold, placed on a steel plate and finally cured by putting into an oven, the temperature of which was initially 200° F. and was raised in 6 hours to 375° F. and maintained at that value for 5 hours. After cooling the finished article was found to have a tensile strength of 1220 pounds per square inch.

As previously indicated, our new process has a number of advantages over those processes heretofore known. For example, it permits the manufacture of articles from resin unadulterated by other materials which have heretofore been necessary, such as resin solvents. It also makes articles having the open, porous structure characteristic of cold pressed articles which is so highly desirable because of the cool and free-cutting property of articles of this type.

Our process also permits of a much more rapid curing treatment than is possible where liquid plasticizing agents are added, as in the previously known methods, because the liquids used in those methods tend to make the bond fluid and necessitate a low temperature treatment and therefore one of long duration, because quicker cures at higher temperatures result in the bond flowing. This feature is of particular value in cases where articles must be completed in the shortest possible time, apart from the saving in oven equipment required for curing.

Although we have illustrated our invention by specific examples, our process is not limited to the details given therein. Other types of resins, such as polymerized styrol or meta-styrene and other reversible resins or glycerol-phthalic anhydride resins, urea-formaldehyde and furfural-formaldehyde, which are regarded as irreversible resins, may be substituted for the phenolic condensation products designated in the examples. Similarly other types and proportions of abrasive grains may be substituted for that used in the illustration.

Inert fillers such as pulverized flint, pulverized silicon carbide and others that are commonly used in the abrasive art may also be incorporated by mixing them with the resin either prior to or during the grain-coating step; and other obvious steps and alternatives may be practiced without departing from the spirit of our invention, the scope of which is defined in the appended claims.

We claim:

1. The method of manufacturing resin bonded abrasive articles which comprises preparing a loose mass of abrasive grain to which is attached a fusible heat hardenable resin solid at ordinary room temperatures and free from liquid plasticizers, which mass because of lack of cohesion cannot be molded at ordinary room temperatures, shaping an article by placing the mass in a mold and heating to an extent sufficient to make the resin adhesive and cause the article to retain its shape when cooled and removed from the mold but not enough to cure the resin, cooling the article in the mold until the resin hardens sufficiently to make the article self supporting, removing the article from the mold and heating it to cure the resin.

2. The method of manufacturing resin bonded abrasive articles which comprises preparing a loose mass of abrasive grains to which is attached a fusible heat-hardenable resin which is solid at ordinary room temperatures and which is so dry, non-adhesive and hard that the mass cannot be molded at ordinary room temperatures, shaping an article by placing the mass in a mold and heating to an extent sufficient to make the resin adhesive and cause the article to retain its shape when cooled and removed from the mold but not enough to cure the resin, cooling the article in the mold until the resin hardens sufficiently to make the article self-supporting, removing the article from the mold and heating it to cure the resin.

3. The method of manufacturing resin bonded abrasive articles which comprises preparing a loose mass of abrasive grains to which is attached a fusible heat-hardenable resin which is solid at ordinary room temperatures and which is so dry, non-adhesive and hard that the mass cannot be molded at ordinary room temperatures, pressing an article from a mass in a mold at ordinary temperatures, heating the formed article in the mold to an extent sufficient to make the resin adhesive and cause the article to retain its shape when cooled and removed from the mold but not enough to cure the resin, cooling the article in the mold until the resin hardens sufficiently to make the article self supporting, removing the article from the mold, and heating it to cure the resin.

4. The method of manufacturing resin bonded abrasive articles which comprises preparing a loose mass of abrasive grains to which is attached a fusible, heat-hardenable resin which is solid at ordinary room temperatures and which is so dry, non-adhesive and hard that the mass cannot be molded at ordinary room temperatures, pressing an article from the mass in a mold while applying heat to an extent sufficient to soften the resin at the outer surfaces of the article sufficiently to make the cooled article self-supporting and cause the article to retain its shape when cooled and removed from the mold but not enough to cure the resin, cooling the article in the mold until the resin hardens sufficiently to make the article self supporting, removing the article from the mold, and heating it to cure the resin.

HARRY C. MARTIN.
FREDERICK A. UPPER.